J. A. BUTTRESS.
AIR GAGE.
APPLICATION FILED SEPT. 3, 1909.
1,021,915. Patented Apr. 2, 1912.
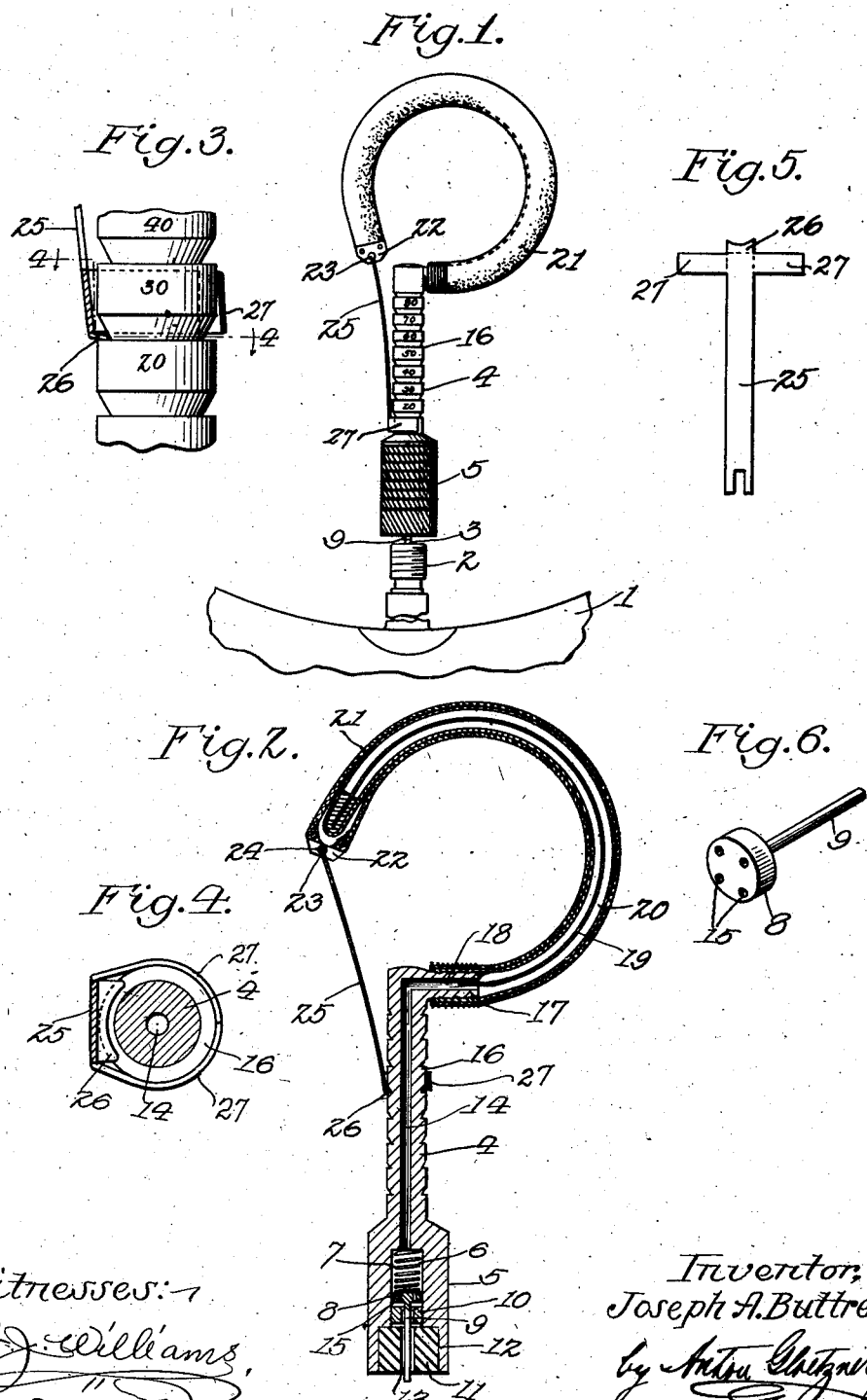
Witnesses:
O. J. Williams
J. Vincent Harmon
Inventor,
Joseph A. Buttress.
by his Attorney.

UNITED STATES PATENT OFFICE.

JOSEPH A. BUTTRESS, OF LOS ANGELES, CALIFORNIA, ASSIGNOR, BY MESNE ASSIGNMENTS, OF ONE-FOURTH TO S. HERLINGER, OF LOS ANGELES, CALIFORNIA.

AIR-GAGE.

1,021,915.  Specification of Letters Patent.  Patented Apr. 2, 1912.

Application filed September 3, 1909. Serial No. 516,152.

*To all whom it may concern:*

Be it known that I, JOSEPH A. BUTTRESS, a citizen of the United States, residing at Los Angeles, in the county of Los Angeles and State of California, have invented certain new and useful Improvements in Air-Gages, of which the following is a specification.

This invention relates to a pressure indicating device and has particular reference to an air gage for determining the pressure of air in tires for power vehicles.

In devices now used having similar functional properties the index or indicating element returns to its normal position of rest immediately upon the relief of pressure from the supply within an inclosed body, making in this manner incumbent upon the user the reading of the register before disconnecting with the tire or container.

One of the objects of this invention therefore is to provide a gage which registers the pressure of air within a tire or other receptacle, and in which the indicator remains in its position of original registration when removed from the source the pressure of which it has registered.

Another object of this invention is to provide in combination with an air gage, a mechanism which combines two distinct functions, namely: operates, or more properly stated, unseats the tire valve to permit the air to escape, and is actuated or unseated when the tire valve has reached the limit of its movement.

With these and other objects in view, this invention consists of the features, details of construction and combination of parts, as will be described in connection with the accompanying drawing and then be more particularly pointed out in the claims.

In the drawings, Figure 1 is a side elevation of my invention showing use of the same in connection with the valve of a tire. Fig. 2 is an enlarged sectional elevation, showing the position of the stem and head when forced inwardly by a tire valve stem. Fig. 3 is a fragmentary detail of the shouldered scale, and the indicator coöperating therewith. Fig. 4 is a transverse section of said scale on lines 4—4 Fig. 3. Fig. 5 is a plan detail showing the indicator before formed and attached to the gage, and Fig. 6 is a perspective view of the head with its stem head showing the perforations.

Specifically referring to the drawing 1 designates the fragment of a tire, provided with the ordinary inlet valve 2, the stem 3 of which is shown projecting from the top of the casing.

The gage forming the gist of the present invention, consists of a scale 4, having a knurled end 5, within the recess 6 of which is housed a spring 7, exerting tension against the head 8 provided with a stem 9. The stem and head are held in place within the end 5 by a nut 10, forming a seat for the head 8, and through which nut the said stem 9 projects. A gasket of compressible material shown at 11, is placed in the hollow end 12 of the scale. This gasket 11 is provided with a central bore 13 into and through which the said stem 9 extends and terminates at a point slightly beyond the gasket and the knurled end 5 as seen in Fig. 1.

In Fig. 1, the stem 9 is shown in engagement with the stem 3 of the tire valve. The tension of the spring 7 in the knurled end 5 being greater than the tension of the means for holding the tire valve stem in normally closed position, it is obvious that when depressed, the stem 9 will open or unseat the tire valve stem 3 and permit the air to escape. Should this occur before the unseating of the head on the stem 9, which unseating results by continued pressure when the tire valve stem 3 has reached the limit of its movement, the air from the tire will not escape to the atmosphere, because even though the head of the stem 9 has not moved from its seat, the air from the tire, being confined in its travel therefrom to the scale by the washer 11, will enter into the passage 14, of the scale through the openings provided therefor in the head 8. In this manner, an excessive amount of pressure to seal the air gage to the tire valve and at the same time to open the tire valve is eliminated. When the tire valve is unseated, the stem 9 will move the head 8 from its seat 10 permitting thereby the air from the tire to enter the gage through the openings 15 provided therefor in said head. Immediately upon disconnecting the gage from the source of pressure the head 8 will be forced onto its seat 10 by the spring confined in the gage. Since a great many gages exist in which the indicator returns immediately to normal position upon being disconnected from the source of pressure, and therefore a true and accurate registration of pressure is difficult, I have devised a means presently described, whereby the original registration will be indicated at all times after removal of the same from the source the pressure of which it has registered, until manually actuated to cause the indicator to return to normal position. Said scale is provided with a series of notches or annular shoulders 16, and contiguous with or attached to the end of the same is a nipple 17, having a bore 18, which is continuous with the passage 14 of the scale 4. Extending transversely through and secured in any suitable manner to said nipple 17, is a resilient circular member 19, in the nature of a flat spring, the free end of which is made fast to a flexible, sealed tube or hose 20, in which said flat spring is housed. Said tube or hose 20 is arranged to fit over and engage the nipple 17 of the scale 4, and into this tube the volume of air from the tire or other source enters, causing a responsive expansion of the tube and the incased spring 19 proportionally with the pressure of the volume in the tire.

In Fig. 2 I have shown the end of the flat spring 19, embedded in a solid body of rubber, and in order to prevent dissociation, I prefer to serrate the end of the spring thus embedded. The tube or hose 20 of rubber or other flexible material is incased in a cover of leather or other material 21, one end of the same being fastened to the nipple 17, and the other end being sealed by a clasp 22. This clasp 22 carries a pintle 23, upon which are hung the butts 24 of an indicator 25, which encircles the scale 4 along which it is designed to travel. Said indicator 25 is provided with a lip 26 which is arranged to engage the notches or shoulders 16 of the scale 4. The air entering through the scale to the tube 20 causes an expansion of the same against the tension of the flat spring 19, and as the pressure increases, the indicator 25 travels along the scale. When the gage is removed from the source of supply, the flat spring tends to resume its normal position, but the lip 26 engaging the shoulders of the scale prevents such action. Therefore when the gage is removed, the indicator registers the exact amount of pressure within the tire or other container, and only a slight touch at the joint between the indicator and the casing for the tube is necessary to free the lip from engagement with the shoulder and effect its return to normal position. The mechanism shown in the knurled portion of the scale 4 has been devised primarily to compensate for the variations frequently existing in the tire valves now commonly used.

The stems of a great many tire valves vary in length, consequently are either far below the edge of the valve casing or extend far beyond the same. In both instances gages of the present construction and particularly those having a fixed tire valve unseating element, would fail to operate. Where the tire valve stem is below the edge of the casing, the fixed stem of a gage cannot reach and unseat the tire valve stem, because the distance of travel of the fixed stem and gage beyond the compressible gasket is limited and does not equal the distance between the end of the tire valve stem and the top or edge of the valve casing. On the other hand, where a tire valve stem projects beyond the edge of the valve casing, that is, to such an extent that upon depression and unseating of the valve, the stem thereof will still be above the edge of the casing, it is obvious that the fixed stem of the gage will serve only to relieve the air from the tire and allow the same to escape to the atmosphere, because the valve stem will have reached the limit of its movement before the gasket of the gage has formed a seal between the valve casing and the gage. Since variations in the tire valve stems exist and must always exist as a result either of manufacture or usage, I have devised the means hereinbefore described for adapting a gage to all tire valves. If the tire valve stem is low, the projecting stem of the gage is sufficiently long to reach and unseat the tire valve, or, if not in itself sufficient for this purpose, the additional length given it by the compression of the gasket, will be ample for all variations of this character. If the tire valve stem be above the casing, the stem projecting from the gage will only initially unseat the tire valve and permit a small quantity of air to escape to the atmosphere, but the operation of the gage will not be stopped when the tire valve stem reaches the limit of its movement, even though at that time no seal has been formed to confine the travel of air from the tire to the gage. The stem and head of the gage, by continued manual pressure, against the now stationary tire valve stem, will move against the tension of the spring 7, such movement continuing until the gasket has reached, and, by compression, sealed the passage from the tire valve casing to the bored scale.

As will be seen, the stem 9 with the head 8 thereof is movable against the tension of a spring 7, which is sufficient to overcome and unseat the valve stem in the tire valve. Consequently the said stem may project slightly beyond the rubber gasket 11 or may be flush with the same without affecting the operativeness of the same, and the gasket may comprise but a small piece of material. In similar devices now employed, the stem is made rigid, in which case the rubber gasket must extend far beyond the end of the stem in order to effect a close contact of the gage with the valve casing previous to the unseating of the valve in the tire casing.

The indicator 25 is slightly yielding to allow for the angularity of travel, the tendency of which is not in a direct vertical line, and the fingers 27 thereof fit closely about the said scale, whereby the indicator is preserved against careless handling and removal from the scale by any excess pressure, its movement being limited by the nipple 17.

What I claim, is:

1. A hollow scale, an indicator operatively connected with said scale, tension means connected with said scale, a fluid pressure receiving tube inclosing said tension means, said indicator and scale being connected with said tube, and means on said indicator to prevent the return of said indicator to normal position.

2. A hollow scale, an indicator operatively connected therewith, tension means connected with said scale, and a fluid pressure receiving tube connected with said scale and inclosing said tension means, said indicator being hingedly connected with said tube.

3. A hollow scale having a head in one end thereof, and a nipple secured to the other end, a resilient member connected with said nipple, a hollow flexible body fitting said nipple, and incasing said resilient member, and an indicator pivotally connected with the free end of said flexible body, and arranged to operate on said scale.

4. A hollow scale provided with a head in one end and a nipple at the other end, a flexible fluid-receiving body fitting said nipple, said body being closed at one end, a resilient member incased in said flexible body, and secured at one end to said nipple, and an indicator pivotally connected with said body and operatively connected with said scale and arranged to travel thereon to indicate the pressure.

5. The combination with a hollow scale provided with annular shoulders and a nipple, of a resilient member connected with said nipple, a flexible fluid-receiving tube secured to said nipple and incasing said resilient member, a casing for said tube and an indicator pivotally connected with said casing and operatively connected with said scale, said indicator being arranged to engage said shoulders.

6. A hollow scale provided with a head in one end and a nipple at the other end, a flexible fluid receiving body fitting said nipple, said body being closed at one end, a resilient member incased in said flexible body and secured at one end to the said nipple, an indicator pivotally attached to the free end of said flexible body, and means on said scale and indicator to hold said indicator in its position of indication.

7. An air gage comprising a scale having a nipple and an air duct, a headed stem to control the air to said scale, a circular spring fixed to said nipple, a tube connected with said nipple and incasing said spring, a cover for said tube, and an indicator pivoted with said cover and operatively connected with said scale.

8. An air gage comprising a shouldered scale having a central air duct, a headed stem in said scale, a nipple on said scale extending at right angles thereto, a circular spring fixed to said nipple, a tube fitting over said nipple and incasing said spring, a cover for said tube, an indicator hingedly connected with said cover, and loosely engaging said scale, and means on said indicator to engage the shoulders on said scale.

9. An air gage comprising a scale having a duct, and a recessed end, a washer in said recessed end having a bore, a seat in said recessed end, a headed stem extending through the bore in said seat and washer and projecting slightly beyond said washer, and a spring to normally hold the head of said stem against said seat, in combination with a rubber tube connected with said scale, a spring housed in said tube and rigidly connected with said scale, an indicator connected with said tube and scale and means on said scale and indicator respectively and coöperating to hold said indicator in position of indication.

10. A shouldered scale having a bore and a nipple, a covered rubber tube fitting said nipple, a spring in said tube and fastened to one end thereof, the other end thereof being fastened to said nipple, an indicator pivotally connected with said tube and loosely engaging said scale, means on said scale and indicator respectively and coöperating to hold said indicator in position of indication, a washer in the end of said scale, a stem having an apertured head, a seat for said head, and a spring to normlly hold said head against said seat.

11. The combination with a shouldered scale having an air duct, of a resilient member connected with said scale, a fluid receiving tube also connected with said scale, and incasing said member, and means hingedly connected with said tube and loosely engaging said scale to indicate the pressure, said means being arranged to engage the shoulders on said scale.

12. An air gage comprising a bored scale having an indicator operatively connected therewith, and an expansible means for operating said indicator, means on said indicator and scale respectively and coöperating to hold said indicator in position of indication, and a spring pressed member in one end of said scale for unseating a tire valve.

13. An air gage comprising a bored scale having an indicator operatively connected therewith, an expansion means connecting the indicator with said scale, means on said indicator and scale respectively and coöperating to hold said indicator in position of indication, a projection in one end of said scale, and means engaging said projection to hold same stationary for unseating a tire valve, said means serving to allow said projection to yield when the tire valve has reached the limit of its movement.

14. An air gage comprising a bored scale having a fluid controlled expansible member connected therewith, an indicator on said expansible member and operatively connected with said scale, means on said scale and indicator to hold said indicator in position of indication, a stem in said scale having a perforated head, and means to normally hold said stem projected to unseat a tire valve, said means being arranged to yield when such tire valve has reached the limit of its movement.

15. An air gage comprising a bored scale having an indicator operatively connected therewith, a fluid pressure operated tube connecting said indicator with said scale, means on said scale and indicator to hold said indicator in position of indication, a compressible seat in one end of said scale arranged to fit against the casing of a tire valve, a stem in said scale provided with a perforated head, and tension means to normally hold said stem projected to overcome and unseat a tire valve, said tension means being arranged to yield when such tire valve has reached the limit of its movement.

In testimony whereof I affix my signature in the presence of two witnesses.

JOSEPH A. BUTTRESS.

Witnesses:
J. VINCENT HARMON,
ANTON GLOETZNER, Jr.

---

Copies of this patent may be obtained for five cents each, by addressing the "Commissioner of Patents, Washington, D. C."